US008960777B2

(12) United States Patent
Bisror et al.

(10) Patent No.: US 8,960,777 B2
(45) Date of Patent: Feb. 24, 2015

(54) DEFORMABLE LOWER CROSSBEAM FOR A WINDOW OPENING

(75) Inventors: Olivier Bisror, Le Plessis Robinson (FR); Guillaume Camus, Guyancourt (FR)

(73) Assignee: Renault S.A.S., Boulogne-Billancourt (FR)

(*) Notice: Subject to any disclaimer, the term of this patent is extended or adjusted under 35 U.S.C. 154(b) by 0 days.

(21) Appl. No.: 13/877,053

(22) PCT Filed: Sep. 19, 2011

(86) PCT No.: PCT/FR2011/052141
§ 371 (c)(1),
(2), (4) Date: May 21, 2013

(87) PCT Pub. No.: WO2012/042147
PCT Pub. Date: Apr. 5, 2012

(65) Prior Publication Data
US 2013/0229031 A1 Sep. 5, 2013

(30) Foreign Application Priority Data
Sep. 30, 2010 (FR) ...................................... 10 57908

(51) Int. Cl.
*B62D 25/08* (2006.01)
*B62D 25/10* (2006.01)
*B62D 25/14* (2006.01)

(52) U.S. Cl.
CPC .............. *B62D 25/081* (2013.01); *B62D 25/14* (2013.01)
USPC ....................................... 296/201; 296/96.21

(58) Field of Classification Search
USPC ............ 296/201, 192, 96.21, 187.04, 187.01, 296/193.02, 203.02
See application file for complete search history.

(56) References Cited

U.S. PATENT DOCUMENTS

| 4,146,263 | A | * | 3/1979 | Watari ...................... 296/96.21 |
| 4,943,102 | A | * | 7/1990 | Hamamoto et al. ....... 296/96.21 |
| 6,193,304 | B1 | | 2/2001 | Takahashi et al. |
| 6,193,305 | B1 | | 2/2001 | Takahashi |
| 6,447,052 | B2 | * | 9/2002 | Saeki ....................... 296/187.09 |
| 7,000,979 | B2 | * | 2/2006 | Borkowski et al. ........... 296/192 |
| 7,004,534 | B2 | * | 2/2006 | Yoshii et al. .................. 296/192 |
| 7,267,394 | B1 | * | 9/2007 | Mouch et al. ............ 296/203.02 |
| 7,357,446 | B2 | * | 4/2008 | Sakai et al. .................... 296/192 |
| 7,594,692 | B2 | * | 9/2009 | Shishido .................. 296/203.02 |

FOREIGN PATENT DOCUMENTS

DE 10 2009 032 855 1/2010

OTHER PUBLICATIONS

International Search Report Issued Jan. 16, 2012 in PCT/FR11/052141 Filed Sep. 19, 2011.

* cited by examiner

*Primary Examiner* — Glenn Dayoan
*Assistant Examiner* — Sunsurraye Westbrook
(74) *Attorney, Agent, or Firm* — Oblon, Spivak, McClelland, Maier & Neustadt, L.L.P.

(57) ABSTRACT

A lower crossbeam for a window opening, the lower crossbeam to be installed between an edge of a windshield and a firewall. The lower crossbeam includes: a first portion having an attachment edge connected to a firewall and a receiving edge for receiving the windshield edge; and a second portion having a bearing edge and a connecting edge connected to the first portion while dividing the first portion into a receiving portion and an attachment portion. The bearing edge is connectable to the firewall so as to form a transverse hollow shell between the second portion and the attachment portion.

12 Claims, 3 Drawing Sheets

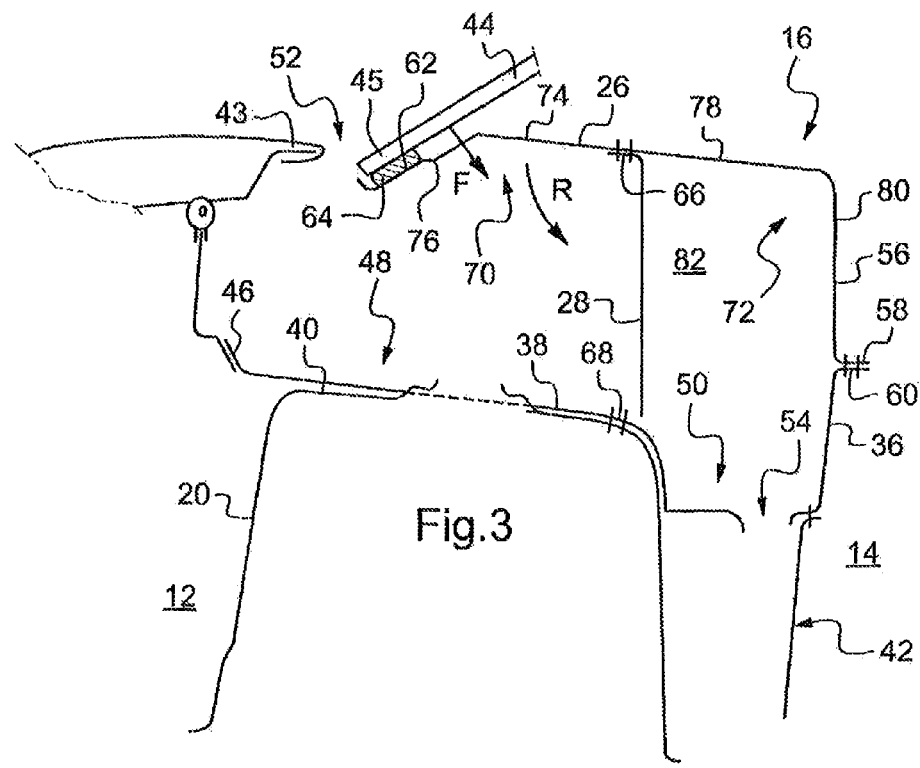
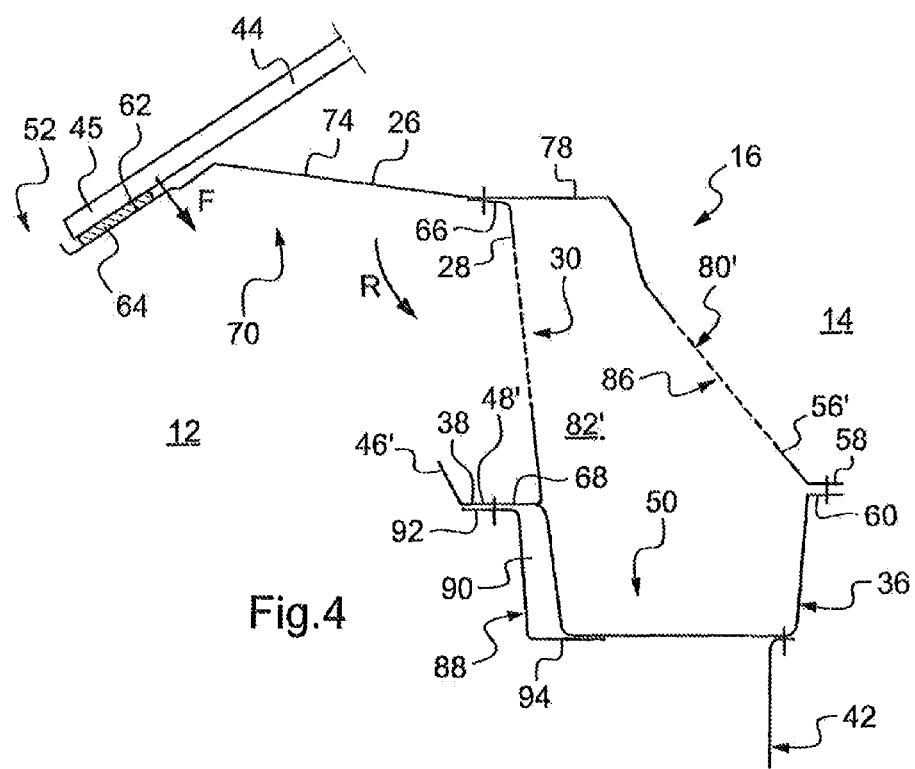

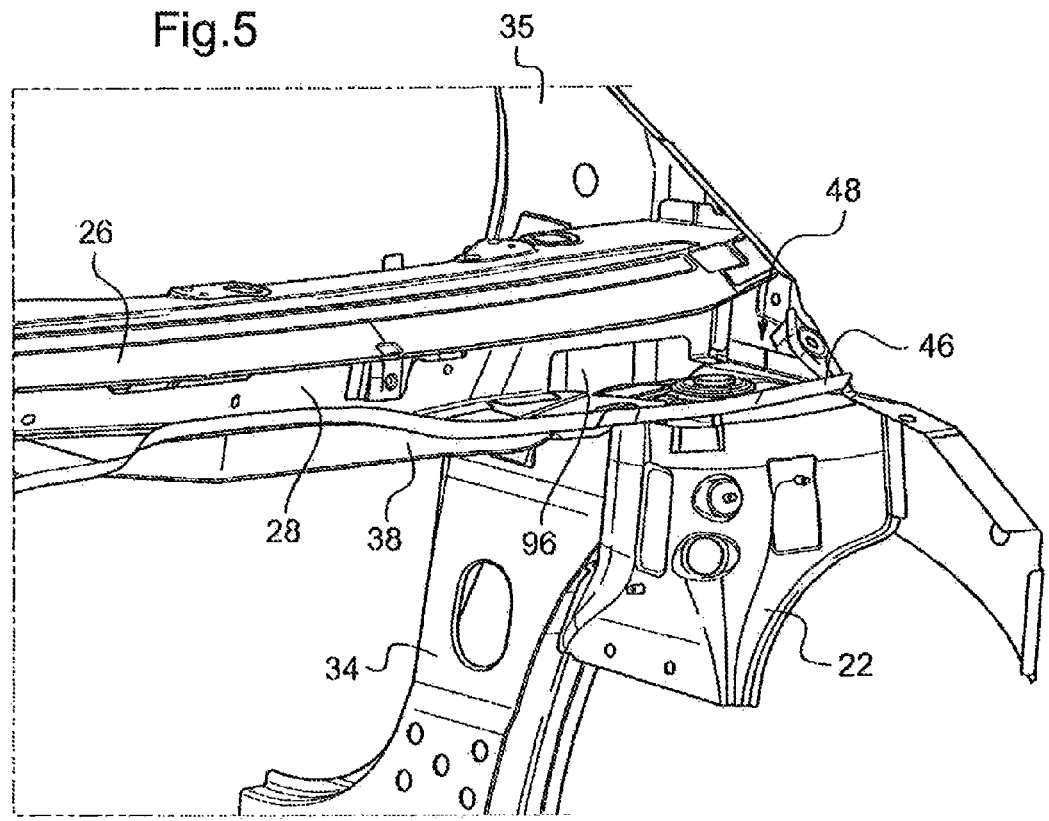

DEFORMABLE LOWER CROSSBEAM FOR A WINDOW OPENING

TITLE

The present invention relates to a window opening lower crossbeam intended to be installed at the front of a motor vehicle.

BACKGROUND

The front of motor vehicles has a structure in which the windshield, the hood and the bulkhead separating the engine compartment from the passenger compartment meet. The window opening lower crossbeam is secured to the bulkhead in such a way as to be able to support the windshield on which the latter rests. Hence, the lower crossbeam is installed transversely and, according to the vertical and longitudinal components of the vehicle, extends between a lower edge of the windshield and the bulkhead which itself extends substantially plumb with said windshield. In order to perform its role of supporting the windshield, the window opening lower crossbeam has to be sufficiently strong. Hence it usually comprises two transverse parts combined with one another, an upper window opening lower crossbeam and a lower window opening lower crossbeam, so as to form a transverse box structure, or hollow body, on which the lower edge of the windshield rests directly. To do this, of the two transverse parts, a first part having a fixing transverse edge and, opposite, a receiving transverse edge, is fitted between the bulkhead and the windshield. The first part constitutes the upper window opening lower crossbeam. The fixing edge is therefore engaged on the bulkhead, while the lower edge of the windshield rests in the receiving transverse edge. The second transverse part of the crossbeam, which has a transverse connecting edge and an opposite transverse resting edge, is fitted against the first part in such a way that the connecting edge is connected to the first part between the first fixing edge and the first receiving edge of the first part and that the resting edge is connected to the receiving transverse edge of the first part, thereby forming a tubular element therewith, which tubular element constitutes the transverse box structure. The second part constitutes the lower window opening lower crossbeam. As a result, the lower edge of the windshield is held directly by the transverse box structure which itself rests laterally in the structure of the motor vehicle, and notably on the shock-absorber cups.

Moreover, the connecting edge of the second transverse part divides the first part into a receiving portion which extends toward the receiving edge thereby forming one wall of the transverse box structure and an opposite fixing portion which extends toward the fixing edge of the first part and which meets the bulkhead. This fixing portion is, by nature, deformable and in the event of a pedestrian impact, i.e. in the event of the relative movement of an individual toward the windshield of the vehicle, allows the windshield precisely to be able to push in in order to dissipate some of the mechanical energy generated by the impact and thus as far as possible safeguard the vital parts of said pedestrian, notably the pedestrian's head.

Reference may be made to document U.S. Pat. No. 6,193,304 which describes such a shock-absorbing lower crossbeam.

However, the transverse box structure which is required for supporting the windshield limits the ability of the aforementioned fixing portion to deform and, at the same time, limits the possibilities for dissipating the energy generated by the impact.

So, one problem which arises and which the present invention seeks to overcome is that of supplying a window opening lower crossbeam which, while supporting the windshield of the motor vehicle, has a better ability to deform in order to safeguard individuals in the event of an impact.

BRIEF SUMMARY

To this end, the present invention proposes a lower crossbeam for a motor vehicle front window opening and intended to be installed transversely in a motor vehicle between a lower edge of a windshield and a bulkhead situated plumb with the windshield, said crossbeam comprising a first and a second transverse part which are substantially parallel to one another, said first part having a fixing edge that can be connected to said bulkhead and a receiving edge opposite said fixing edge to accept said windshield lower edge, while said second part has, firstly, a connecting edge connected to said first part between said first fixing edge and said first receiving edge, thereby dividing said first part into a receiving portion extending toward said receiving edge and an opposite fixing portion extending toward said fixing edge and, secondly, a resting edge opposite said connecting edge, said second and first transverse parts being intended to form a transverse box structure to increase the rigidity of said crossbeam, whereas said first part is able to bend along said connecting edge when said windshield is pushed in under the effect of an impact. According to the invention, said resting edge of said second part can be connected to said bulkhead in such a way as to form said transverse box structure between said second part and said fixing portion of said first part in a position distant from said windshield lower edge, whereas said receiving portion extends between said transverse box structure and said windshield lower edge.

Thus, one feature of the invention lies in the use of the transverse box structure, or hollow body, which is no longer directly in contact with the lower edge of the windshield but lies in a position distant from this lower edge, toward the bulkhead, whereas the receiving portion of the first crossbeam part itself does precisely extend between the transverse box structure and the lower edge of the windshield. In that way, it is no longer the transverse box structure directly which absorbs the load in the event of a pedestrian impact and the pushing-in of the windshield, but the receiving portion of the first transverse part which then has a tendency to bend toward the box structure along the connecting edge of the second part connected to the first part of the crossbeam. The transverse box structure effectively forms a beam which has a far lower ability to bend under load than does a simple wall such as the receiving portion of the first transverse part. Hence, thanks to the abilities of this receiving portion to deform, in the event of a pedestrian impact with the windshield, this windshield will be pushed in as the receiving portion supporting it gradually undergoes plastic deformation and bends.

According to one particularly advantageous feature of the invention, said fixing portion of said first part has a transverse zone running alongside said receiving portion substantially perpendicular to said second part. Thus, the transverse zone forms, with the second part, two transverse box structure walls which are adjacent at right angles, thus improving the rigidity thereof. For preference, said second part has a recess forming an inlet opening providing access to the inside of the transverse box structure. This inlet opening notably allows air to be admitted to the ventilation circuit, as will be explained in greater detail hereinafter.

Furthermore, and according to one particularly advantageous embodiment of the invention, said vehicle comprises a heating duct transverse lower wall able to be connected to said bulkhead, and said fixing edge of said first part is connected to said bulkhead via said transverse lower wall. This heating duct transverse lower wall extends in a longitudinal direction of the vehicle, from the bulkhead against which it rests, toward the front of the vehicle plumb with the lower edge of the windshield and with an edge of the hood of the vehicle adjacent to said windshield lower edge. Thus, the fixing edge of the first crossbeam part is secured to the bulkhead via the heating duct transverse lower wall.

In addition, said resting edge of said second part is preferably likewise connected to said bulkhead via said heating duct transverse lower wall. In that way, the portion of transverse lower wall comprised between the fixing edge of the first part of crossbeam and the resting edge of the second part, the second part itself and the fixing portion of the first part, then form a tubular structure that constitutes the transverse box structure. The latter is then directly connected to the bulkhead.

Moreover, said heating duct transverse lower wall has a first wall transverse edge, able to receive said fixing edge of said first part, and an opposite second wall transverse edge, able to extend plumb with said receiving edge of said first part. These two opposite wall transverse edges are bent toward one another to form a receptacle. In addition to guiding air toward the ventilation circuit, this receptacle is also intended to receive the water which runs off between the edge of the hood and the lower edge of the windshield so that this water can then be discharged.

Also, said heating duct transverse lower wall has a transverse portion which is sunken along said first wall transverse edge in an opposite direction to said fixing portion of said first part. In that way, water running off specifically between the edge of the hood and the lower edge of the windshield is conveyed under gravity into the sunken transverse portion. Advantageously, said sunken transverse portion has an orifice to form a discharge opening, along the bulkhead. Such an orifice is made in a lateral portion of the transverse lower wall.

According to one particularly advantageous embodiment of the invention, said vehicle further comprises two lateral shock-absorber cups situated substantially plumb with said receiving edge of said first part, and said heating duct transverse lower wall rests on said lateral shock-absorber cups. In that way, the lower crossbeam also rests laterally, via the heating duct transverse lower wall, on the lateral shock-absorber cups.

Advantageously, said first and second transverse parts of said crossbeam are made of a deformable metallic material, so as to be able to deform plastically in the event of an impact, the mechanical energy absorbed then being dissipated in the form of heat.

BRIEF DESCRIPTION OF THE DRAWINGS

Other specifics and advantages of the invention will become apparent from a reading of the description given hereinbelow of one particular embodiment of the invention, given by way of nonlimiting indication with reference to the attached drawings in which:

FIG. 3 is a schematic view in axial section on the plane III-III of the part depicted in FIG. 2, supplemented by other components;

FIG. 4 is a schematic view in axial section on the plane IV-IV of the structural element depicted in FIG. 1, supplemented with other components; and FIG. 5 is a schematic three-quarters front perspective view of another part of the structural element depicted in FIG. 1.

DETAILED DESCRIPTION

Figure 1:
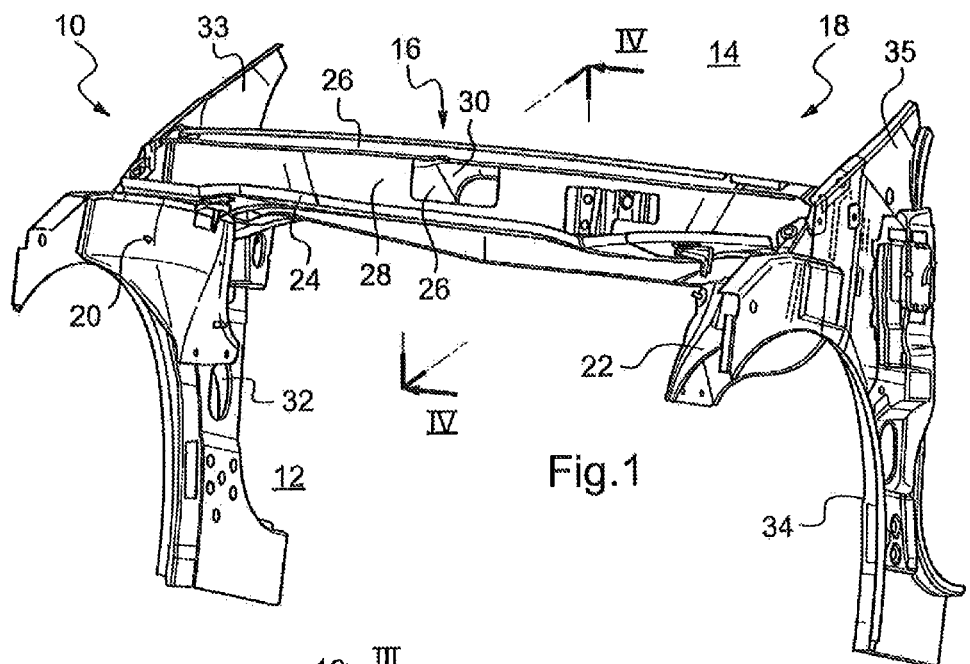
FIG. 1 is a schematic three-quarters front perspective view of a structural element of a motor vehicle including a window opening lower crossbeam according to the invention.

FIG. 1 illustrates a structural element 10 of a motor vehicle which extends transversely between an engine compartment 12 situated toward the front of the motor vehicle and a passenger compartment 14 situated toward the rear. The structural element 10 has a window opening lower crossbeam 16 which extends transversely under the window opening 18 of the motor vehicle. The structural element 10 also has two shock-absorber cup raisers 20, 22 opposite one another and on which a heating duct transverse lower wall 24 described in greater detail hereinafter rests laterally. The window opening lower crossbeam 16 comprises a first part 26, or upper window opening lower crossbeam, and a second part 28, or lower window opening lower crossbeam. The latter has a central recess 30 forming a first inlet opening through which the continuation of the first part 26 can be glimpsed. According to one particularly advantageous embodiment of the invention, the first and second parts 26, 28 are respectively each made from a single sheet metal component of a thickness of between 1 mm and 0.5 mm, for example 0.65 mm so as to be able to undergo plastic deformation if need be, as will be explained hereinafter.

The structural element 10 has two opposite legs 32, 34 between which, plumb with the window opening lower crossbeam 16, there extends a bulkhead which has not been depicted in this FIG. 1. Furthermore, vertically, on the opposite side to the legs 32, 34, there extend two lateral uprights 33, 35, depicted here in part, and against which the respective lateral edges of a windshield not depicted in this FIG. 1 rest.

Figure 2:
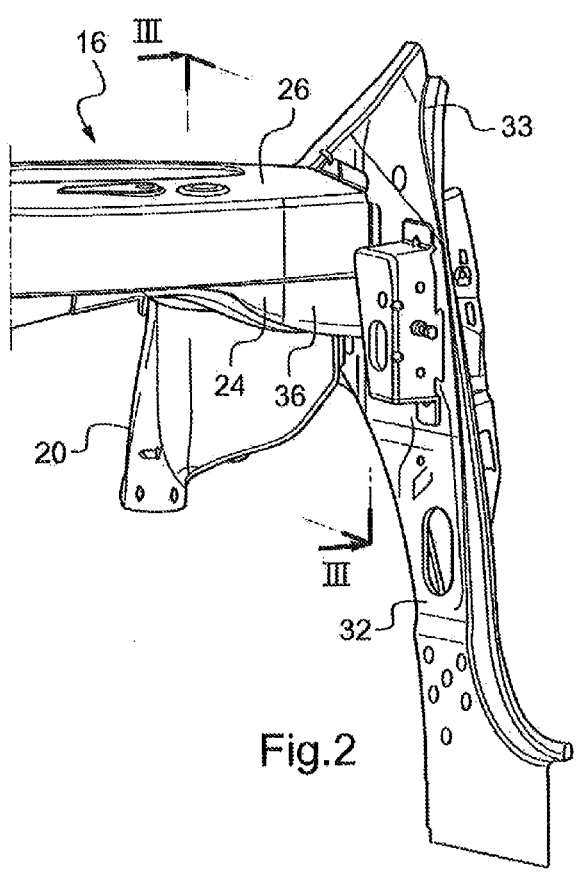
FIG. 2 is a schematic three-quarters rear perspective view of part of the structural element depicted in FIG. 1.

Reference will be made to FIG. 2 which shows again, but from a different angle, one, 32, of the two opposite legs, one, 20, of the two shock-absorber cup raisers and the first part 26 of the window opening lower crossbeam showing two perpendicular walls that will be described hereinafter and which is secured to a first curved edge 36 of the heating duct transverse lower wall 24 against which it rests.

Thus, FIG. 3 again schematically shows the window opening lower crossbeam first part 26 and the second part 28 which was visible in FIG. 1. It also again shows said one shock-absorber cup raiser 20 and the curved first edge 36 of a heating duct transverse lower wall 38 which presses against an upper part 40 of the shock-absorber cup raiser 20.

In addition, this FIG. 3 illustrates additional components to the structural element 10. Thus, a bulkhead 42 which extends substantially vertically between the passenger compartment 14 and the engine compartment 12, has resting against it the heating duct transverse lower wall 38 in the region of the curved edge 36. Also, a windshield 44 having a windshield lower edge 45 is partially depicted and extends in line with the window opening lower crossbeam 16, the windshield lower edge 45 running alongside the edge of a hood 43. Before this lower edge is described in detail, a more specific description will first be given of the heating duct transverse lower wall 38 on which the window opening lower crossbeam 16 specifically rests and which itself rests on the bulkhead 42.

Thus the heating duct transverse lower wall 38 extends not only laterally but also longitudinally between its first curved edge 36 situated toward the passenger compartment 14 and an opposite second curved edge 46 situated toward the engine compartment 12. In addition, it is inclined from the second curved edge 46 toward the first curved edge 36 and has, firstly, a first part 48 resting against the upper part 40 of the shock-absorber cup raiser 20 and, secondly, a second part 50 which is sunken along the first curved edge 36. In that way, the first part 48 of the heating duct transverse lower wall 38 extends plumb with a slot 52 which extends transversely between the edge of the hood 43 and the lower edge of the windshield 45 so as to be able to collect water running through this slot 52. Hence, under the effect of gravity, the water will flow toward the sunken second part 50 in order then to be discharged through an orifice 54 formed in the bottom of this sunken second part 50. As will be explained in the remainder of the description, the heating duct transverse lower wall 38 is also able to guide air entering through the slot 52 toward the ventilation installation.

The window opening lower crossbeam 16, considered in line with the shock-absorber cup raiser 20, will now be described in greater detail, still with reference to FIG. 3.

Thus, the window opening lower crossbeam 16, comprising the upper window opening lower crossbeam, or first part 26, and the lower window opening lower crossbeam, or second part 28, extends transversely from one upright 33 to the other 35. The first part 26 has a fixing edge 56 extended by a return 58 which itself comes to rest against a rim 60 of the sunken part 50 turned back in the continuation of the first curved edge 36. Opposite the fixing edge 56, the first part 26 has an opposite receiving edge 62 able to receive the lower edge of the windshield 45. This lower edge is secured thereto using a bead of mastic 64.

As for the second part 28, it has a connecting edge 66 bent back and in the opposite direction a bearing edge 68 which is likewise bent back. The bent-back connecting edge 66 is connected to the first part 26 for example by spot welds, whereas the resting edge 68 is connected to the first part of the heating duct transverse lower wall 38 at the edge of the sunken second part 50. It may also be connected thereto by spot welds. Thus, the connected connecting edge 66 divides the first part 26 into two portions, a receiving portion 70 which extends like a bracket from the connecting edge 66 as far as the receiving edge 62, and an opposite fixing portion 72 which extends from the connecting edge 66 to the fixing edge 56. The receiving portion 70 has a first ledge-like part 74 extending substantially horizontally between the connecting edge 66 and the windshield 44, and a first inclined part 76 extending facing the windshield 44, while the opposite fixing portion 72 has a second ledge-like part 78, or transverse zone, in the continuation of the first ledge-like part 74, and a second part 80 bent back, extending as far as the fixing edge 56. The first ledge-like part 74 extends, in the longitudinal direction of the vehicle, over a width of between 80 mm and 150 mm, whereas the second ledge-like part 78 extends over a width of between 100 mm and 200 mm. It may be noted that this width varies transversely and, particularly in the case of the latter ledge-like part, between the middle of the window opening lower crossbeam 16 and the ends thereof.

Furthermore, the second part 28 extends substantially perpendicular to the two ledge-like parts 74, 78, resting against the heating duct transverse lower wall 38, while the second bent-back part 80 of the fixing portion 72 extends substantially parallel to the second part 28 to rest against the first curved edge 36 of the heating duct transverse lower wall 24. In that way, the second part 28 of the window opening lower crossbeam 16, the second ledge-like part 78, the second bent-back part 80 on the one hand, and the sunken second part 50 of the heating duct transverse lower wall 38 on the other hand, constitute a tubular element here referred to as a transverse box structure 82 or hollow body. This transverse box structure 82 rests on the bulkhead 42 and also in part at its opposite ends on the upper part 40 of the shock-absorber cup raisers 20, 22. By contrast, it extends some distance away from the windshield 44 and, more specifically, from the lower edge 45, whereas the receiving portion 70 itself, by acting like a bracket out from the transverse box structure 82, extends as far as the connecting edge 66 of the second part 28 to meet the windshield lower edge 45 and receive it in its opposite receiving edge 62.

Before setting out the advantages of the structure described hereinabove, the same window opening lower crossbeam 16, considered not now in line with the shock-absorber cup raiser 20 but in the median plane of the motor vehicle or, more specifically, between the shock-absorber cup raisers 20, will first of all be described with reference to FIG. 4. That figure shows the same components again, but some with a different shape because the window opening lower crossbeam 16 has curved parts. Hence, the parts which differ in shape will bear the same references followed by a "'" symbol.

Thus, in the same way, the figure shows the lower edge 45 of the windshield 44 which is kept bonded against the receiving edge 62 of the first part 26 by means of the bead of mastic 64. It also again shows the bulkhead 42 supporting the sunken second part 50 of the heating duct transverse lower wall 38, which has a restricted first part 48' extended by the curved edge 46'. The second part 28 has kept the same shape and the figure again shows the central recess 30 that forms the first air inlet opening admitting air to the transverse box structure 82'. This air comes in from the slot 52. Moreover, the second ledge-like part 78' is not as wide whereas the second bent-back part 80' is in the form of an inclined plane leading as far as the fixing edge 56' thereof. The second bent part 80' has another recess 86 forming an air outlet leading to the vehicle ventilation system.

Moreover, and according to one particularly advantageous embodiment of the invention, a Z section 88 is fitted along the sunken second part 50 to form another tubular element 90 forming a second hollow body. One of the flanges 92 of the Z section is connected to the restricted first part 48' of the heating duct transverse lower wall 38, from underneath, while the other flange 94 is secured to the bottom of the sunken second part 50. Thus, the Z section 88 forms a transverse and additional central reinforcement attached to the heating duct transverse lower wall 38. That notably makes it possible to stiffen the zone extending transversely under the window opening and therefore stiffen the acoustics within the motor vehicle.

Finally, reference will be made to FIG. 5 to complete the structural description of the window opening lower crossbeam 16, before returning to FIGS. 3 and 4 for a description of the functionalities thereof. This FIG. 5 illustrates the other end of the window opening lower crossbeam 16 in a three-quarters front view from the engine compartment. It again shows the shock-absorber cup 22, the leg 34 and the opposite upright 35 together with the first 26 and second 28 parts of the window opening lower crossbeam 16. Moreover, it also again shows the first part 48 of the heating duct transverse lower wall 38 and the curved second edge 46 thereof. In addition, it may be seen that the second part 28 of the window opening lower crossbeam 16 has, in the region of the shock-absorber cup raiser 22, a second recess 96 allowing the discharge of water but also allowing air into the transverse box structure 82.

With reference to FIGS. 3 and 4 it can be clearly seen that the transverse box structure 82, 82', made as a single piece, lies some distance from the zone of connection between the lower edge 45 of the windshield 44 and the receiving edge 62 of the upper window opening lower crossbeam, or first part, 26.

Thus, thanks to this arrangement, in the event of a pedestrian impact in which the lower edge 45 of the windshield 44 is pushed in toward the bulkhead 42 in the direction of the arrow F, the receiving portion 70 of the first part 26 will then deform, pivoting in a counterclockwise direction about the zone of connection between the connecting edge 66 of the second part 28 and the first part 26. In that way, by deforming and bending, the receiving portion 70 absorbs the mechanical energy generated by the pedestrian impact and dissipates it partially in the form of heat. In addition, because the windshield 44 and the transverse box structure 82, 82' are distant from one another, when the windshield 44 is pushed in, the extent of its movement corresponding to the deformation of the receiving portion 70 alone is greater than it would have been had the lower edge 45 been resting directly against the transverse box structure 82, 82'. As a result, a greater amount of mechanical energy can be absorbed, thereby safeguarding the pedestrian in the impact.

What is more, such an arrangement not only allows air to flow from outside to the ventilation system through the transverse box structure 82, 82' but also allows the water collected in the heating duct transverse lower wall 38 to be discharged.

The invention claimed is:

1. A lower crossbeam for a motor vehicle front window opening and configured to be installed transversely in a motor vehicle between a lower edge of a windshield and a bulkhead situated plumb with the windshield, the lower crossbeam comprising:
    a first and a second transverse part which are substantially parallel to one another;
    the first part including a fixing edge that can be connected to the bulkhead and a receiving edge opposite the fixing edge to accept the windshield lower edge;
    the second part including a connecting edge connected to the first part between the first fixing edge and the first receiving edge, thereby dividing the first part into a receiving portion extending toward the receiving edge and an opposite fixing portion extending toward the fixing edge and a resting edge opposite the connecting edge;
    the second and first transverse parts configured to form a transverse box structure to increase rigidity of the crossbeam, whereas the first part is configured to bend along the connecting edge when the windshield is pushed in under effect of an impact; and
    the resting edge of the second part can be connected to the bulkhead in such a way as to form the transverse box structure between the second part and the fixing portion of the first part in a position distant from the windshield lower edge, whereas the receiving portion extends between the transverse box structure and the windshield lower edge.

2. The lower crossbeam as claimed in claim 1, wherein the fixing portion of the first part includes a transverse zone running alongside the receiving portion substantially perpendicular to the second part.

3. The lower crossbeam as claimed in claim 1, wherein the fixing portion of the first part includes a bent-back part that extends substantially parallel to the second part.

4. The lower crossbeam as claimed in claim 1, wherein the second part includes a recess forming an inlet opening providing access to an inside of the transverse box structure.

5. The lower crossbeam as claimed in claim 1, wherein the vehicle further comprises a heating duct transverse lower wall configured to be connected to the bulkhead, and the fixing edge of the first part is connected to the bulkhead via the transverse lower wall.

6. The lower crossbeam as claimed in claim 5, wherein the resting edge of the second part is connected to the bulkhead via the transverse lower wall.

7. The lower crossbeam as claimed in claim 5, wherein the transverse lower wall includes a first wall transverse edge, configured to receive the fixing edge of the first part, and an opposite second wall transverse edge, configured to extend plumb with the receiving edge of the first part.

8. The lower crossbeam as claimed in claim 7, wherein the transverse lower wall includes a transverse portion that is sunken along the first wall transverse edge in an opposite direction to the fixing portion of the first part.

9. The lower crossbeam as claimed in claim 8, wherein the sunken transverse portion includes an orifice to form a discharge opening.

10. The lower crossbeam as claimed in claim 5, wherein the vehicle further comprises two lateral shock-absorber cups situated substantially plumb with the receiving edge of the first part, and wherein the transverse lower wall rests on the lateral shock-absorber cups.

11. The lower crossbeam as claimed in claim 1, wherein the first and second transverse parts of the crossbeam are made of a deformable metallic material.

12. The lower crossbeam as claimed in claim 1, wherein the connecting edge of the second part is connected to a bottom face of the first part.

* * * * *